March 4, 1958 — L. H. BOHLEY — 2,825,172
FISH LURE
Filed July 15, 1955
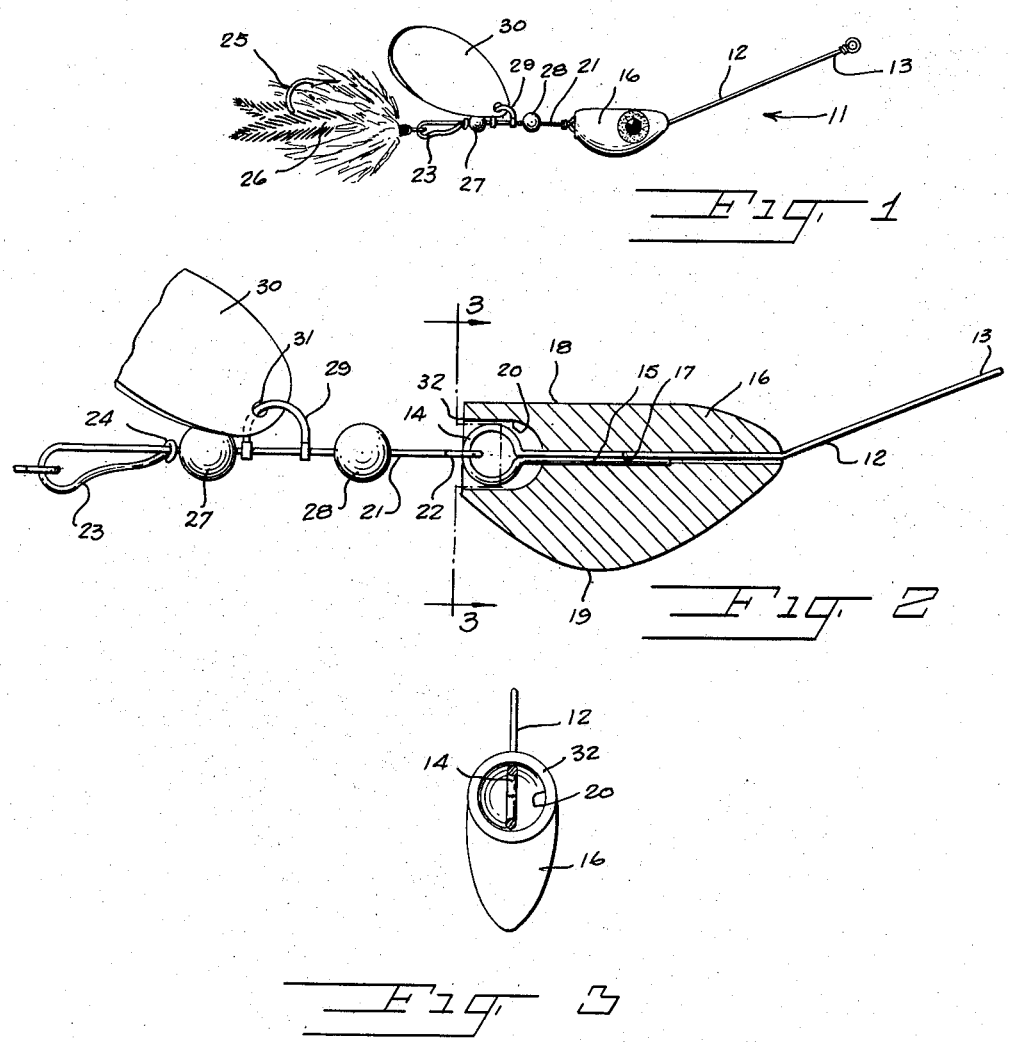
INVENTOR.
Louie H. Bohley
BY
McMorrow, Berman + Davidson
Attorneys

United States Patent Office 2,825,172
Patented Mar. 4, 1958

2,825,172

FISH LURE

Louie H. Bohley, Medina, Ohio

Application July 15, 1955, Serial No. 522,195

2 Claims. (Cl. 43—42.16)

This invention relates to fishermen's equipment, and more particularly to an improved fish lure of the spinner type.

The main object of the invention is to provide a novel and improved fish lure which is simple in construction, which is inexpensive to manufacture, and which is arranged so that it will not twist the line to which it is attached when in use, and so that the hook element thereof will not become entangled with the fishing line when casting.

A further object of the invention is to provide an improved fishing lure which is highly attractive to fish, which is durable in construction, which will maintain a substantially constant upright position during its use, and which is arranged so that the spinner element thereof will rotate freely under all conditions of use of the lure.

Further objects and advantages of the invention will become apparent from the following description and claims, and from the accompanying drawings, wherein:

Figure 1 is a side elevational view of an improved fishing lure constructed in accordance with the present invention.

Figure 2 is an enlarged longitudinal vertical cross sectional view taken through the fishing lure of Figure 1.

Figure 3 is a transverse vertical cross sectional view taken on the line 3—3 of Figure 2.

Referring to the drawings, the improved fish lure is designated generally at 11 and comprises a leader member 12 of any suitable material, such as wire or the like, said leader member having a forward end portion 13 adapted to be connected to a fishing line, and being formed at its rear end with a substantially circular loop 14 and with a rear end portion 15 which is engageable against the main body portion of the leader. As shown, the forward end portion 13 of the leader may be inclined at an angle to the rear portion of the leader. Designated at 16 is an elongated lure body of relatively heavy material secured on the rear portion 15 of the leader, as for example, by the provision of a longitudinal bore 17 through the body 16 extending parallel to the top edge 18 of said body and located relatively close to said top edge, the body 16 having a downwardly convex bottom edge 19 and thus having the major portion of the body disposed below the rear portion of the leader 12. The rear end of the body 16 is formed with a recess 20 in which the loop 14 is received, as is clearly shown in Figure 2.

Designated at 21 is a spinner shaft of wire or suitable substantially rigid material which is pivotally connected to the loop 14, as by a pivot loop 22 formed on the forward end of the spinner shaft 21. The rear end of the spinner shaft 21 is formed with a resilient loop 23 having a catch hook 24 which may be at times disengaged from the spinner shaft 21 to open the loop 23, as for the engagement of a fishing hook 25 with the loop 23. The fishing hook 25 is preferably provided with a tufted tail member 26, as illustrated in Figure 1, whereby the hook 25 and the tufted tail element 26 simulate the tail of a bait fish, when pivotally connected to the rear end of the spinner shaft 21.

Secured on the shaft 21 are the spaced beads 27, 28, and rotatably and slidably mounted on the shaft 21 between the beads 27 and 28 is the U-shaped spinner connecter 29. As is clearly shown in Figure 2, the width of the U-shaped connector 29 is substantially less than the spacing between the beads 27, 28, whereby said beads allow sliding movement of the connector for a limited distance therebetween. Designated at 30 is a spinner plate having an aperture 31 in its forward end portion, the U-shaped connecter 29 being engaged through the aperture 31, as shown in Figure 2, whereby the spinner 30 is pivotally and slidably connected to the U-shaped member 29.

The spinner member 30 comprises a generally oval brightly polished concave plate, brightly polished on both sides, of substantial size which rotates freely and which freely slides along the spinner shaft 21 between the beads 27 and 28 as the lure is drawn through the water.

In operation, the elongated lure body 16 tends to remain constantly in an upright position as the lure is drawn through the water, since the major portion of the weight of the body 16 is below the leader 12. The body 16 thus acts in the manner of a keel to maintain itself in an upright position. The shaft 21 is pivoted to the rear end of the body 16 at the loop 14 and is free to oscillate from side to side, carrying the reflective spinner 30, said spinner being free to revolve as well as to oscillate, and being free to move longitudinally between the beads 27 and 28 on the shaft 21. The tufted hook 25 is also free to oscillate because of its pivotal connection with the loop 23, whereby the lure simulates the action of a swimming fish as it is drawn through the water.

The lure above described is arranged so that it will not twist the fishing line attached to the leader 12 because the weighted keel member 16 remains upright. The hook 25 will not swing forwardly and become entangled with the line when casting because the tension of the fishing line exerted on the leader 12 keeps the weighted body 16 ahead of the line during casting. Furthermore, since the loop 14 is substantially entirely housed in the recess 20, the edge of the recess 20, shown at 32, prevents the shaft 21 from rotating forwardly sufficiently to allow the hook 25 to reach the fishing line or forward portion 13 of the leader. The free rotational connection of the member 29 on the shaft 21 and the pivotal connection of the loop 22 with the loop 14 allow the spinner 30 to substantially align itself with the remainder of the lure and to spin freely regardless of whether the line is lowered or raised in the water.

While a specific embodiment of an improved fish lure has been disclosed in the foregoing description, it will be understood that various modifications within the spirit of the invention will occur to those skilled in the art. Therefore, it is intended that no limitations be placed on the invention except as defined by the scope of the appended claims.

What is claimed is:

1. A fish lure comprising a leader member adapted to be connected to a fishing line, an elongated lure body of relatively heavy material secured on said leader member, said body having a relatively straight top edge extending parallel to said leader member and having a downwardly convex bottom edge, and having a major portion of the body disposed below said leader member, the rear end of said body being formed with a recess adjacent said leader member, said recess having a circular rim, and being spaced below said top edge and opening only at the rear end of said body, said leader member having an eye loop on the rear end thereof completely housed in said recess and extending substantially to the plane of said rim, a spinner shaft having an eye loop at its end pivotally connected to said first-named eye loop in said recess and extending rearwardly and outwardly therefrom, whereby the spinner shaft may pivot substantially in all directions, said spinner shaft being engageable with said rim to limit forward rotation thereof, a pair of spaced bead members fixedly secured on said spinner shaft, a U-shaped connector rotatably and slidably connected to said spinner shaft between said bead members and being substantially smaller in width than the spacing between said bead members, whereby said bead members allow sliding movement of the connector for a limited distance therebetween, and a spinner plate pivotally connected to said U-shaped connector.

2. A fish lure comprising a leader member adapted to be connected to a fishing line, an elongated lure body of relatively heavy material secured on said leader member, said body having a relatively straight top edge extending parallel to said leader member and having a downwardly convex bottom edge, and having a major portion of the body disposed below said leader member, the rear end of said body being formed with a recess adjacent said leader member, said recess having a circular rim and being spaced below said top edge and opening only at the rear end of said body, said leader member having an eye loop on the rear end thereof completely housed in said recess and extending substantially to the plane of said rim, a spinner shaft having an eye loop at its end pivotally connected to said first-named eye loop in said recess and extending rearwardly and outwardly therefrom, whereby the spinner shaft may pivot substantially in all directions, said spinner shaft being engageable with said rim to limit forward rotation thereof, a pair of spaced bead members fixedly secured on said spinner shaft, a U-shaped connector rotatably and slidably connected to said spinner shaft between said bead members and being substantially smaller in width than the spacing between said bead members, whereby said bead members allow sliding movement of the connector for a limited distance therebetween, and a spinner plate pivotally connected to said U-shaped connector, a further eye loop on the rear end of said spinner shaft, and a tufted tail member including a fishhook, pivotally connected to said further eye loop.

References Cited in the file of this patent
UNITED STATES PATENTS

| | | |
|---|---|---|
| 1,467,116 | Reckers | Sept. 4, 1923 |
| 1,474,823 | Hines | Nov. 20, 1923 |
| 1,610,204 | Donholt | Dec. 7, 1926 |
| 1,867,555 | Hildebrandt | July 19, 1932 |
| 2,323,096 | McDowell | June 29, 1943 |
| 2,481,445 | Premo | Sept. 6, 1949 |
| 2,482,648 | Brandt | Sept. 20, 1949 |
| 2,516,434 | Swan | July 25, 1950 |
| 2,775,840 | Dumas | Jan. 1, 1957 |

FOREIGN PATENTS

| | | |
|---|---|---|
| 842,172 | France | Feb. 27, 1939 |
| 975,706 | France | Oct. 17, 1950 |